United States Patent
Zhang et al.

(10) Patent No.: US 9,952,049 B2
(45) Date of Patent: Apr. 24, 2018

(54) METHODS AND APPARATUS FOR PERFORMANCE ASSESSMENT OF A VEHICLE ONBOARD NAVIGATION SYSTEM USING ADAPTIVE STOCHASTIC FILTERING

(71) Applicant: GM GLOBAL TECHNOLOGY OPERATIONS LLC, Detroit, MI (US)

(72) Inventors: Xian Zhang, Wixom, MI (US); Xiaofeng Frank Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/849,726

(22) Filed: Sep. 10, 2015

(65) Prior Publication Data

US 2017/0074661 A1   Mar. 16, 2017

(51) Int. Cl.
| | | |
|---|---|---|
| *G01C 21/30* | (2006.01) | |
| *G01C 21/20* | (2006.01) | |
| *G01C 21/16* | (2006.01) | |
| G01C 21/34 | (2006.01) | |
| G01C 21/26 | (2006.01) | |
| G01S 19/40 | (2010.01) | |

(52) U.S. Cl.
CPC ............ *G01C 21/20* (2013.01); *G01C 21/16* (2013.01); *G01C 21/165* (2013.01); *G01C 21/26* (2013.01); *G01C 21/34* (2013.01); *G01S 19/40* (2013.01)

(58) Field of Classification Search
CPC ........ G01C 21/20; G01C 21/16; G01C 21/34; G01C 21/26; G01C 21/165; G01S 19/40

USPC ................. 701/445, 431, 208, 439
See application file for complete search history.

(56) References Cited

U.S. PATENT DOCUMENTS

| | | |
|---|---|---|
| 8,700,324 B2 | 4/2014 | Halder |
| 8,996,197 B2 | 3/2015 | Joh et al. |
| 9,052,207 B2 | 6/2015 | Miksa et al. |
| 9,109,907 B2 | 8/2015 | Park et al. |
| 9,435,653 B2 | 9/2016 | Zeng et al. |
| 9,529,092 B2 | 12/2016 | Friend et al. |
| 2011/0118979 A1* | 5/2011 | Mao ............... G01C 21/005 701/532 |
| 2012/0053831 A1* | 3/2012 | Halder ............ G01C 21/165 701/439 |

(Continued)

OTHER PUBLICATIONS

Song, Xiaofeng F., U.S. Appl. No. 14/823,693 entitled "Methods and Apparatus for Evaluating Operation of a Vehicle Onboard Navigation System Using Lateral Offset Data," filed Aug. 11, 2015.

(Continued)

*Primary Examiner* — Mahmoud S Ismail
(74) *Attorney, Agent, or Firm* — Lorenz & Kopf, LLP

(57) ABSTRACT

A method for monitoring performance of a navigation system onboard a vehicle is provided. The method obtains, at a vehicle electronic control unit (ECU), a triangulated vehicle location and vehicle motion data, the triangulated vehicle location obtained from the navigation system; computes an estimated vehicle location, using the triangulated vehicle location and the vehicle motion data; calculates a probability that the estimated vehicle location exists within an error bound of the triangulated vehicle location; and when the probability indicates that the estimated vehicle location does not exist within the error bound, performs a task onboard the vehicle.

14 Claims, 5 Drawing Sheets

(56) References Cited

U.S. PATENT DOCUMENTS

| | | | |
|---|---|---|---|
| 2012/0109517 A1* | 5/2012 | Watanabe | G01C 21/28 |
| | | | 701/431 |
| 2013/0162824 A1 | 6/2013 | Sung et al. | |
| 2014/0379254 A1 | 12/2014 | Miksa et al. | |
| 2016/0282128 A1 | 9/2016 | Zeng et al. | |
| 2016/0358477 A1* | 12/2016 | Ansari | G08G 1/167 |
| 2016/0377437 A1 | 12/2016 | Brannstrom et al. | |

OTHER PUBLICATIONS

USPTO, Office Action in U.S. Appl. No. 14/823,693 dated Feb. 9, 2017.

\* cited by examiner

METHODS AND APPARATUS FOR PERFORMANCE ASSESSMENT OF A VEHICLE ONBOARD NAVIGATION SYSTEM USING ADAPTIVE STOCHASTIC FILTERING

TECHNICAL FIELD

Embodiments of the subject matter described herein relate generally to performance assessment of a navigation system. More particularly, embodiments of the subject matter relate to evaluating accuracy of vehicle navigation system output using adaptive stochastic filtering techniques.

BACKGROUND

Vehicle navigation systems, including global positioning systems (GPS), are commonly used by drivers to obtain current location information, map data, and detailed, turn-by-turn directions to get from a current location to a destination location. However, a typical navigation system only maintains accuracy of up to 2-3 meters (approximately 6.6-9.8 feet). The actual accuracy users attain depends on multiple factors, including, but not limited to, atmospheric effects, sky blockage, and receiver quality. Real-world data from the Federal Aviation Administration (FAA) show that their high-quality GPS SPS receivers provide better than 3.5 meter horizontal accuracy.

Specific applications, such as autonomous vehicle operation, may require increased accuracy for a navigation system, rendering an error of 2 meters (or more) impractical. Further, a driver's dependence upon a potentially flawed navigation system may present unforeseen consequences (e.g., a user following flawed directions presented by the navigation system).

Accordingly, it is desirable to use a mechanism for determining whether a navigation system is providing accurate output. Furthermore, other desirable features and characteristics will become apparent from the subsequent detailed description and the appended claims, taken in conjunction with the accompanying drawings and the foregoing technical field and background.

BRIEF SUMMARY

Some embodiments of the present invention provide a method for monitoring performance of a navigation system onboard a vehicle. The method obtains, at a vehicle electronic control unit (ECU), a triangulated vehicle location and vehicle motion data, the triangulated vehicle location obtained from the navigation system; computes an estimated vehicle location, using the triangulated vehicle location and the vehicle motion data; calculates a probability that the estimated vehicle location exists within an error bound of the triangulated vehicle location; and when the probability indicates that the estimated vehicle location does not exist within the error bound, performs a task onboard the vehicle.

Some embodiments provide a system for monitoring performance of a navigation system onboard a vehicle. The system includes: the navigation system, configured to provide a detected vehicle position and precision specifications associated with operation of the navigation system; at least one vehicle motion sensor, configured to provide vehicle motion data; and an analysis module, configured to: determine an area in which the detected vehicle position is located, using the precision specifications; compute an estimated vehicle position and an associated error value (e.g., an estimated distribution value), based on the detected vehicle position and the vehicle motion data; calculate a probability that the estimated vehicle position exists inside the area; and when the probability is less than a predefined threshold, set a fault flag onboard the vehicle.

Some embodiments provide a non-transitory, computer-readable medium containing instructions thereon, which, when executed by a processor, perform a method. The method calculates, at an electronic control unit (ECU) onboard a vehicle, a probability that an estimated position of the vehicle exists within an allowable margin of error for a triangulated vehicle position, wherein the triangulated vehicle position is provided by a vehicle navigation system, and wherein the allowable margin of error is associated with the vehicle navigation system; and when the probability is less than a predefined threshold, completes a task onboard the vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods used to monitor the performance of a navigation system onboard a vehicle without the aid of a known "ground truth" value. As described below in the context of the present disclosure, navigation system performance is assessed by applying adaptive stochastic filtering to: (i) a measured location of a vehicle, (ii) inertial measurements of the vehicle, and (iii) precision specifications for a navigation system onboard the vehicle. Secondary processing techniques are then applied to the output of the adaptive stochastic filter to produce a probability that an estimated vehicle position exists within an area bounded by a maximum allowable error associated with a measured vehicle position.

Certain terminologies are used with regard to the various embodiments of the present disclosure. The "ground truth" is the actual, physical location of a vehicle at a given time. A "measured" vehicle location is a triangulated location that is detected by an onboard vehicle navigation system (e.g., GPS). An "estimated" vehicle location is a position of the vehicle that has been calculated using theoretical formulas and detected input parameters. A margin of error is generally indicated by the precision specifications of a particular navigation system, and indicates an expected, maximum amount of error associated with operation of the particular navigation system. An error bound delineates the geographic area indicated by the margin of error, in which the vehicle may be located when the navigation system presents a particular reading.

Figure 1:
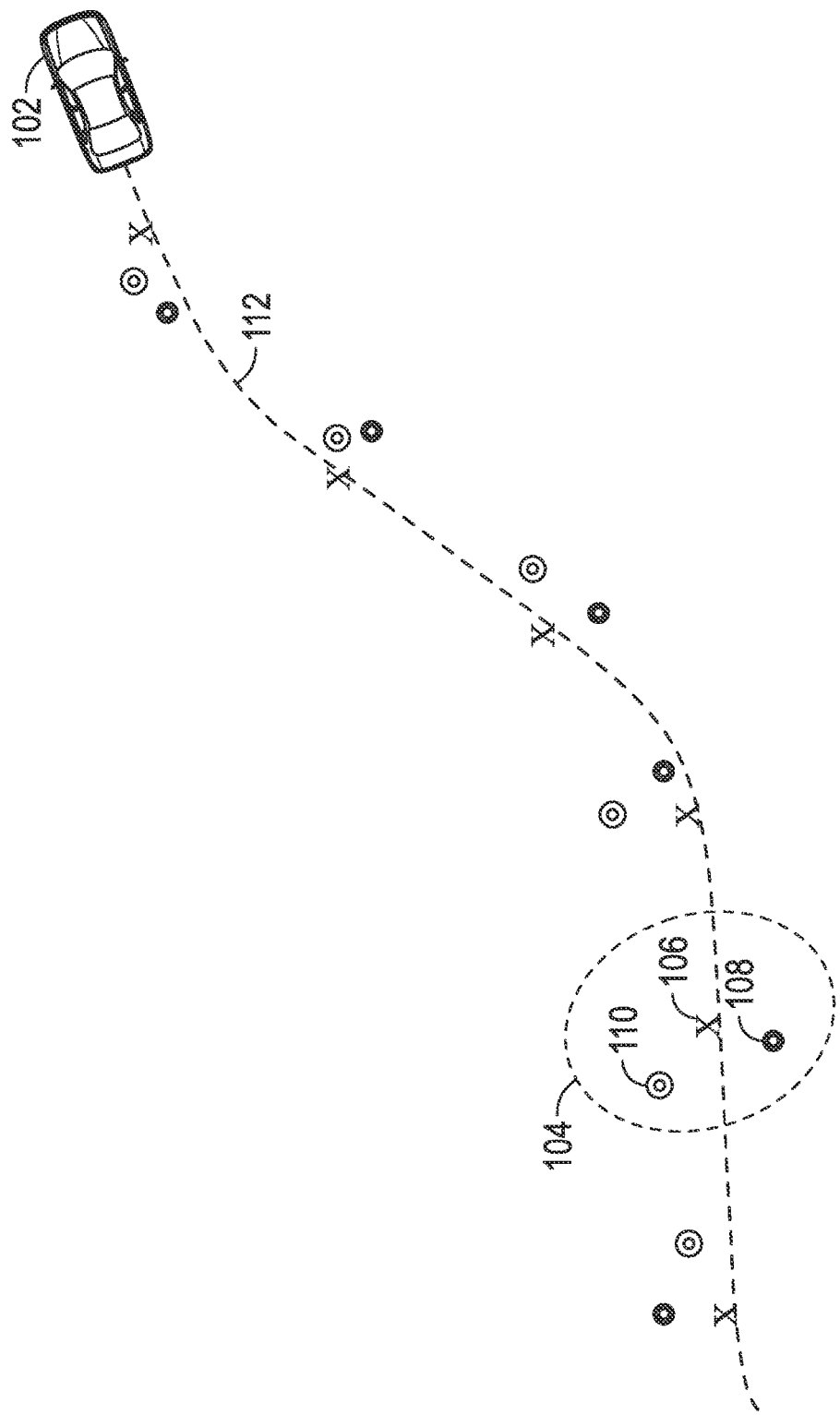
FIG. 1 is a diagram of relationships between vehicle positions, according to different sources, along a driven path, in accordance with the disclosed embodiments.

Turning now to the figures, FIG. 1 is a diagram of relationships between estimated, measured, and actual vehicle positions along a driven path 112, in accordance with the disclosed embodiments. FIG. 1 depicts a vehicle 102, which includes a navigation system (not shown), driving along a path 112. The vehicle 102 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like. The vehicle 102 may include one or more electronic control units (ECUs) for controlling operations of the vehicle 102; an Inertial Measurement Unit (IMU) for providing vehicle motion data (e.g., speed, yaw rate); and a navigation system. The navigation system may be implemented as a global positioning system (GPS), or any other system capable of detecting a triangulated vehicle position at a given time, and within a known margin of error. The navigation system may be used for providing vehicle position data for a current time, map data associated with a current vehicle position, and/or turn-by-turn directions from a current vehicle position to a selected location While traveling the path 112, at particular times of evaluation, the vehicle 102 is located at an "actual" position. The actual position is the physical location of the vehicle 102 at any given time, and may be referred to as the "ground truth". The actual position of the vehicle 102 is usually unknown, and must be detected using a navigation system and/or estimated mathematically. A vehicle position detected by the navigation system is a "detected", "triangulated", or "measured" position, which may be offset from the actual position due to error in operation and accuracy of the navigation system. A vehicle position that is mathematically calculated is a theoretical, mathematical, or estimated position, which may also be offset from the actual position due to error in the parameters used in calculations (e.g., error in speedometer readings, error in yaw rate, etc.) errors in the applied formula, or an expected amount of error in comparing theoretical values to actual values. For example, time instance (t) 104 is shown as a hashed circle at the left side of the path 112. This time instance (t) 104 includes the actual position 106 of the vehicle 102 at time t; the triangulated position 110 that is provided by the navigation system for time t; and an estimated position 108, which is the theoretical position of the vehicle 102 based on calculations performed using measured and theoretical input values. Additional groupings of actual, measured, and estimated vehicle positions are shown along the driving path 112.

Figure 2:
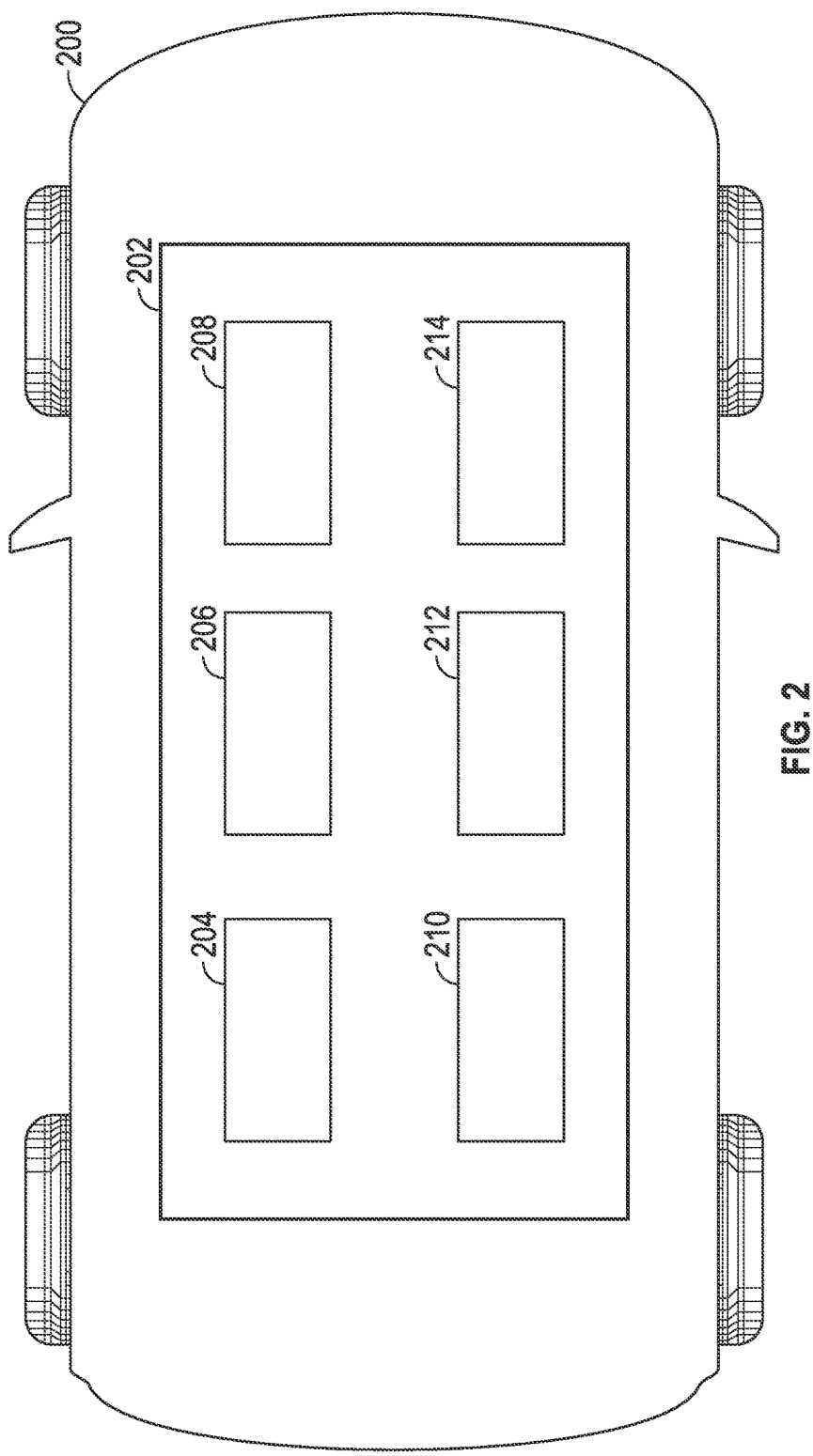
FIG. 2 is a functional block diagram of a performance assessment system for a navigation system, in accordance with the disclosed embodiments.

FIG. 2 is a functional block diagram of a performance assessment system 202 for a navigation system of a vehicle 200, in accordance with the disclosed embodiments. It should be noted that the performance assessment system 202 can be implemented with the vehicle 102 depicted in FIG. 1. In this regard, the performance assessment system 202 shows certain elements and components of the vehicle 102 in more detail. The performance assessment system 202 generally includes, without limitation: at least one processor 204; system memory 206; a navigation system 208; vehicle motion sensors 210; an analysis module 212; and an output module 214. These elements and features of a performance assessment system 202 may be operatively associated with one another, coupled to one another, or otherwise configured to cooperate with one another as needed to support the desired functionality—in particular, monitoring the accuracy of a navigation system for a vehicle 200, as described herein. For ease of illustration and clarity, the various physical, electrical, and logical couplings and interconnections for these elements and features are not depicted in FIG. 2. Moreover, it should be appreciated that embodiments of the performance assessment system 202 will include other elements, modules, and features that cooperate to support the desired functionality. For simplicity, FIG. 2 only depicts certain elements that relate to the performance assessment techniques described in more detail below.

The at least one processor 204 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 204 may be realized as one or more microprocessors, controllers, microcontrollers, or state machines. Moreover, the at least one processor 204 may be implemented as a combination of computing devices, e.g., a combination of digital signal processors and microprocessors, a plurality of microprocessors, one or more microprocessors in conjunction with a digital signal processor core, or any other such configuration.

The system memory 206 may be realized using any number of devices, components, or modules, as appropriate to the embodiment. In practice, the system memory 206 could be realized as RAM memory, flash memory, EPROM memory, EEPROM memory, registers, a hard disk, a removable disk, or any other form of storage medium known in the art. In certain embodiments, the system memory 206 includes a hard disk, which may also be used to support functions of the at least one processor 204. The system memory 206 can be coupled to the at least one processor 204 such that the at least one processor 204 can read information from, and write information to, the system memory 206. In the alternative, the system memory 206 may be integral to the at least one processor 204. As an example, the at least one processor 204 and the system memory 206 may reside in a suitably designed application-specific integrated circuit (ASIC).

The navigation system 208 is deployed onboard the host vehicle 200. In practice, the navigation system 208 may be implemented as part of an onboard vehicle entertainment system, an onboard display system, an onboard vehicle instrumentation cluster, or the like. In one practical embodiment, the navigation system 208 is realized as, includes, or cooperates with an onboard global positioning system (GPS) that derives the current geographic position of the vehicle in real-time or substantially real-time. The navigation system 208 is also configured to obtain map data from an appropriate source that provides data indicative of current cartographic, topological, location, road, and possibly other data useful to the navigation system 208.

The navigation system 208 is configured to provide navigation data to a driver of the vehicle 200. Navigation data may include location data for the vehicle 200, turn-by-turn driving directions, and map information to the vehicle operator. When the vehicle 200 is being driven, the navigation system 208 functions to periodically detect and/or measure a current location for the vehicle 200. The navigation system 208 may present this location data to a driver of the vehicle 200 via a display element or other presentation device. A current location for the vehicle 200 may be a triangulated position, a latitude/longitude position, or any other notation indicative of the position of the vehicle 200.

Due to imperfections in operation of the navigation system 208 (e.g., deficiencies or limitations of satellite communications, hardware, or software of the navigation system 208) each navigation system 208 operates within a margin of error. In other words, output data from the navigation system 208 may be accurate within an anticipated amount of error. This anticipated amount of error is defined in the precision specifications of the navigation system 208 itself, and is generally associated with a particular model of navigation system 208 or version of firmware used by the navigation system 208.

The vehicle motion sensors 210 are located onboard the vehicle 200, and are configured to provide vehicle motion data to the performance assessment system 202. In exemplary embodiments, the vehicle motion sensors 210 detect and provide vehicle speed in an x-direction and a y-direction, and a vehicle yaw rate. In some embodiments, the vehicle motion sensors 210 may also detect and provide other parameters related to movement of the vehicle 200, including but not limited to: acceleration, pitch, roll, slide, resistance, traction, braking force, or the like. In certain exemplary embodiments, the vehicle motion sensors 210 may be implemented as an inertial measurement unit (IMU) of the vehicle 200. In some embodiments, the vehicle motion sensors 210 may include a combination of an IMU and other vehicle-based sensors. The vehicle motion sensors 210 are communicatively coupled to one or more electronic control units (ECUs) via a serial communication bus, which may include a controller area network (CAN) bus, onboard the vehicle 200. Using this communication hardware, the vehicle motion sensors 210 are further configured to provide vehicle motion data to one or more electronic control units (ECUs) of the vehicle 200.

The analysis module 212 is configured to use input data parameters to calculate values indicating a level of accuracy for the navigation system 208. The analysis module 212 is configured to receive input data parameters including, but not limited to: navigation data, motion data for the vehicle 200, and precision specifications for the navigation system 208 onboard the vehicle 200. The analysis module 212 is configured to perform applicable calculations, involving adaptive stochastic filtering and secondary processing operations, to produce a set of output values. Output values may include, without limitation, an estimated location of the vehicle 200, an error value (e.g., estimated distribution value) associated with the estimated location, and a calculated probability that the estimated location of the vehicle 200 exists within a predetermined distance of a currently-detected (via the navigation system 208) position of the vehicle 200. It should be appreciated that the analysis module 212 may obtain and use additional or fewer input arguments, and may generate additional or fewer output values for use by the performance assessment system 202.

The output module 214 is configured to generate and provide appropriate control instructions, commands, or signals that initiate completion of a task onboard the vehicle 200, when performance of the navigation system 208 is not within the acceptable margin of error. In certain embodiments, the completed task may include setting an error flag in a computing system of the vehicle 200. An error flag is used to indicate inaccuracy on the part of the navigation system 208, which may prevent additional action that depends on accurate readings of the navigation system 208. In some embodiments, the output module 214 may halt all or some of the actions performed during operation of the vehicle 200, to include potentially deactivating operation of an autonomous driving application onboard the vehicle 200.

In practice, the analysis module 212 and/or the output module 214 may be implemented with (or cooperate with) the at least one processor 204 to perform at least some of the functions and operations described in more detail herein. In this regard, the analysis module 212 and/or the output module 214 may be realized as suitably written processing logic, application program code, or the like.

Figure 3:
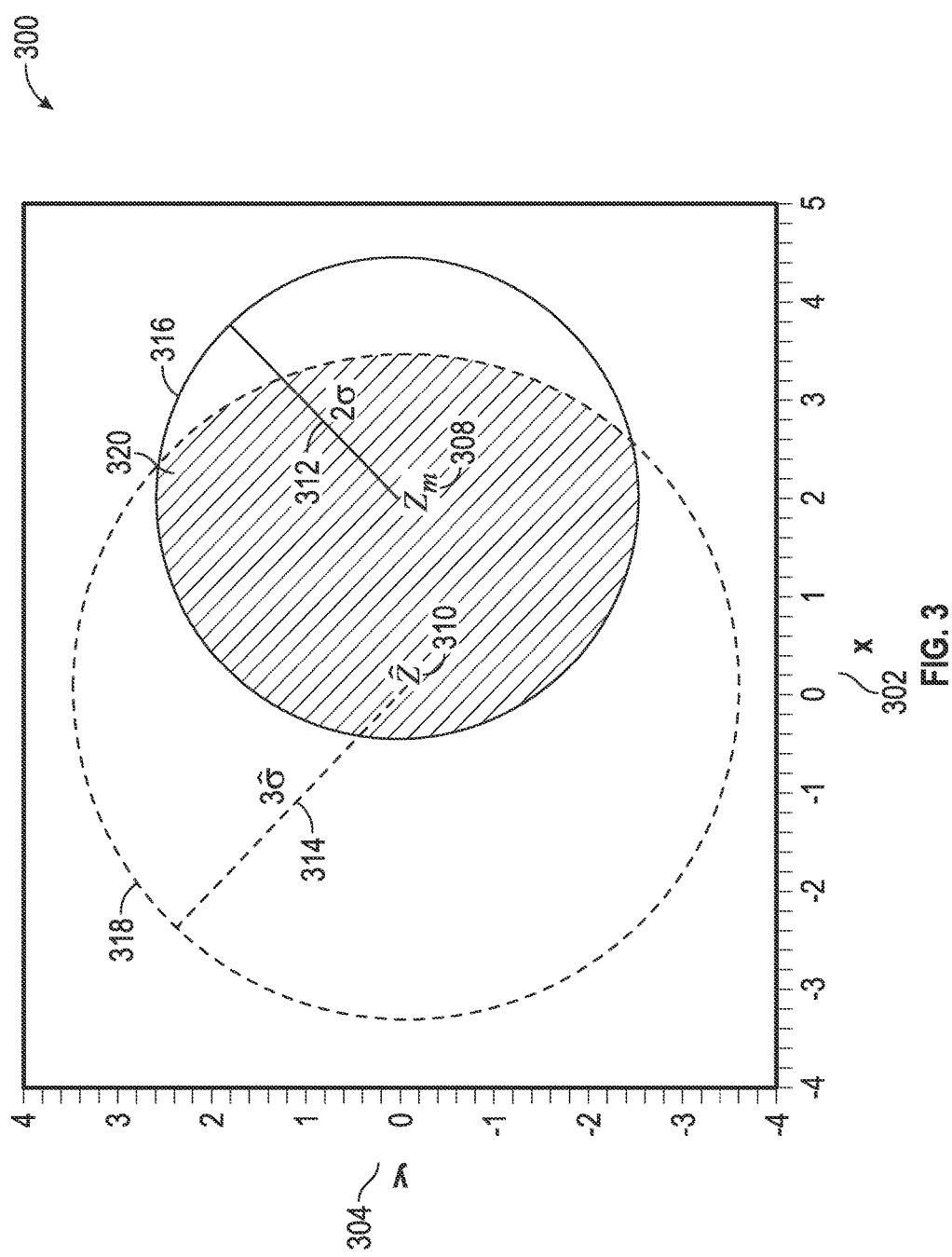
FIG. 3 is a plot showing an overlap of bounded areas in which a vehicle may be actually located, based on detected and calculated vehicle positions, in accordance with the disclosed embodiments.

FIG. 3 is a plot showing an overlap of bounded areas in which a vehicle may be actually located, based on detected and calculated vehicle positions, in accordance with the disclosed embodiments. As shown, a measured location ($z_m$) 308 for a vehicle exists within a margin of error 316. The measured location ($z_m$) 308 indicates a current, triangulated position for the vehicle which is obtained by an onboard vehicle navigation system. This measured location ($z_m$) 308 is accurate within a margin of error 316 that is indicated by a set of precision specifications for the navigation system. Precision specifications are generally provided by the manufacturer of the navigation system. The margin of error 316 is specific to each navigation system, and is based on operational limitations of the navigation system (e.g., hardware imperfections, flaws in communications, etc.). The margin of error 316 presents itself as a circle with a radius ($2\sigma$) 312, and with the measured location ($z_m$) 308 at center. The radius ($2\sigma$) 312 is indicated by the precision specifications for the navigation system. The margin of error 316 delineates a potential actual location for the vehicle (i.e., where the vehicle is actually located), when a vehicle onboard navigation system detects the measured location 308 ($z_m$). In other words, the margin of error 316 surrounds an area in which the vehicle may be located, when the navigation system reading is $z_m$.

Also shown is an estimated position ($\hat{Z}$) 310 for the same vehicle. The estimated position ($\hat{Z}$) 310 is a calculated value obtained using theoretical formulas and input values for inertial measurements associated with operation of the vehicle. The estimated position ($\hat{Z}$) 310 presents itself as the center position of a large circle 318 with radius ($3\hat{\sigma}$) 314. Here, the adaptive stochastic filter produces our estimation of the vehicle location in the form of a Gaussian distribution function, which can be fully described by two parameters: mean value (or expectation) of the position ($\hat{Z}$), and standard deviation ($\hat{\sigma}$). Equivalently, it can be depicted by the large circle 318 (with the mean $\hat{Z}$ at the center of the circle and the (3×) standard deviation $3\hat{\sigma}$ representing the radius), the larger the circle, the wider the distribution and the more uncertain our estimation. The value $3\hat{\sigma}$ is used instead of $\hat{\sigma}$ because, within $3\hat{\sigma}$, the confidence level is 99.7% so the location of the vehicle may be estimated to be within the large circle 318. In short, the large circle 318 with radius ($3\hat{\sigma}$) 314 delineates a boundary within which, according to estimation, the vehicle is located with a probability of 99.7%.

An overlap region 320 exists where the area delineated by the margin of error 316 intersects the area surrounded by the large circle 318. This overlap region 320 shows where the potential actual locations based the measured location ($z_m$) 308 of the vehicle intersect the potential actual locations based on the estimated position ($\hat{Z}$) 310 of the vehicle. The overlap region 320 of the margin of error 316 and the large circle 318 provides a more accurate prediction for the actual location of the vehicle.

Here, x- and y-axes represent a localized (Cartesian) coordinate with the unit m (meter). An estimated Gaussian distribution function is calculated (or approximated) over the region encompassed by the $2\sigma$ circle 314. To do this, the estimated and measured positions (along with the circle that represents the estimated distribution) are positioned in the geographical global coordinate. However, since the concern is the relative, rather than the absolute, position, and since the distribution function is homogeneous in every direction (and for purposes of simplicity), the center of the large circle 318 ($\hat{Z}$) may be used as the origin of the coordinate. Thus, the measured location ($z_m$) 308 may be placed on the x-axis, and the actual location of the vehicle may be studied in this localized coordinate system.

Assessing the performance of the navigation system determines a probability that the actual location of the vehicle exists in the overlap region 320. When a calculated probability value indicates an acceptable likelihood that the vehicle is actually located in the overlap region 320, the navigation system is determined to be operating within an acceptable margin of error. However, when a calculated probability value indicates a low likelihood that the vehicle is actually located in the overlap region 320, then the navigation system is determined not to be operating within the acceptable margin of error.

Figure 4:
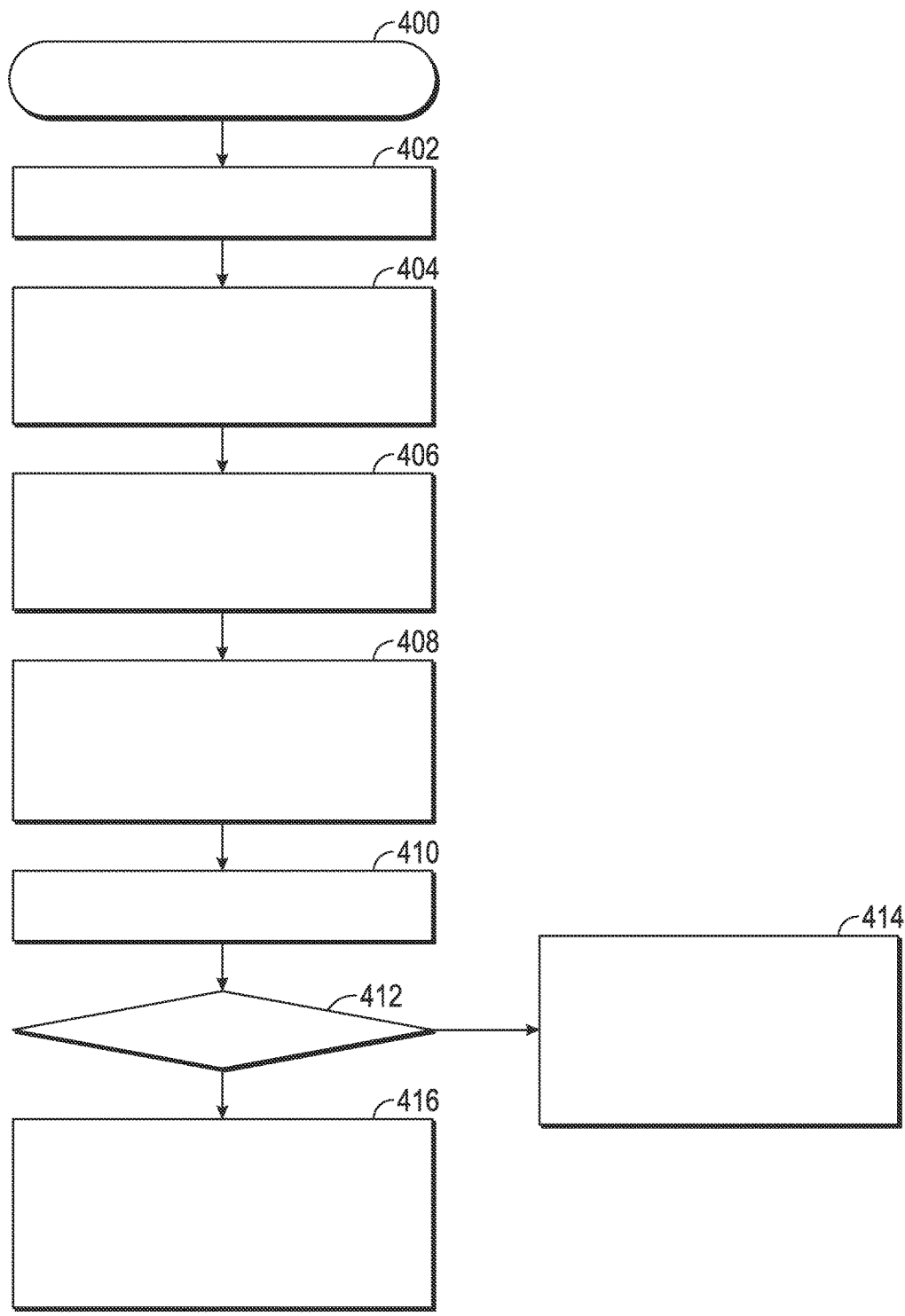
FIG. 4 is a flow chart that illustrates an embodiment of a process for monitoring performance of a navigation system onboard a vehicle.

FIG. 4 is a flow chart that illustrates an embodiment of a process for monitoring performance of a navigation system onboard a vehicle. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For ease of description and clarity, it is assumed that the process 400 begins by obtaining a triangulated vehicle position and vehicle motion data (step 402). The triangulated vehicle position is obtained from an onboard vehicle navigation system, and may be referred to as a measured vehicle position or a GPS vehicle position. The vehicle motion data is obtained from onboard vehicle sensors and/or a vehicle inertial measurement unit (IMU). In certain embodiments, the vehicle motion data may include vehicle speed in an x-direction and a y-direction, and a vehicle yaw rate. In some embodiments, the vehicle motion data may also include other parameters related to movement of the vehicle, including but not limited to: acceleration, pitch, roll, slide, resistance, traction, braking force, or the like.

The process 400 then computes an estimated vehicle position, using the triangulated vehicle position and the vehicle motion data (step 404). One suitable methodology for computing the estimated vehicle position is described below with reference to FIG. 6. The process 400 computes the estimated vehicle position using adaptive stochastic filtering, which may include a Kalman filter, a particle filter, or the like.

Next, the process 400 calculates a probability that the estimated vehicle position exists within an error bound of the triangulated vehicle position (step 406). One suitable methodology for calculating the probability is described below with reference to FIG. 5. The process 400 may calculate the probability using any formula, mathematical operation, or application of a theoretical model used to generate a probability that the estimated vehicle position exists within the margin of error associated with the measured vehicle position provided by the navigation system. In one exemplary embodiment, the process 400 calculates the probability by integrating a normal distribution function over an area bounded by the maximum allowable error, such as that described previously (see FIG. 3, references 316, 320).

After calculating the probability that the estimated vehicle position exists within an error bound of the triangulated vehicle position (step 406), the process 400 obtains a statistical performance index ($\overline{P}$) for a specified time frame by filtering the calculated instantaneous probability ($P(\|e_{z,z_m}\|<\sigma_{Thresh})$) with an exponential moving average filter (step 408). Here, "instantaneous" means that, for every time step, a probability value ($P(\|e_{z,z_m}\|<\sigma_{Thresh})$) is calculated, representing how likely it is that, at the current time step, the measurement is good enough ($\|e_{z,z_m}\|<\sigma_{Thresh}=2\sigma$)).

After obtaining the statistical performance index ($\overline{P}$) (step 408), the process 400 compares the statistical performance index ($\overline{P}$) to a predefined threshold (step 410) to determine how probable it is that the vehicle is actually located at the measured vehicle position that the navigation system has reported, or within an acceptable margin of error. Here, the predefined threshold indicates an allowable, minimum probability that the estimated vehicle position exists within the error bound.

When the probability is not less than the predefined threshold (the "Yes" branch of 412), the process 400 refrains from performing the task onboard the vehicle (step 416). Here, the process 400 determines that the estimated vehicle position exists within the error bound, and that the navigation system is functioning within normal operating limits. In this circumstance, the process 400 permits the vehicle and all onboard systems to continue operating normally.

However, when the probability is less than the threshold (the "No" branch of 412), the process 400 performs a task onboard the vehicle (step 414). Here, the process 400 determines that the estimated vehicle position does not exist within the error bound, and the navigation system is operating outside of normal operating limits (e.g., with more than the allowable amount of error in navigation system readings). The task may include, without limitation, activating an error flag or a fault flag at an ECU onboard the vehicle, presenting an alert or notification, activating or deactivating one or more operations onboard the vehicle, or the like. In an exemplary embodiment, the process 400 deactivates an autonomous driving application. In some embodiments, the process 400 presents, via a navigation system, a notification to a driver that the navigation system is operating with more than the allowable amount of error.

Figure 5:
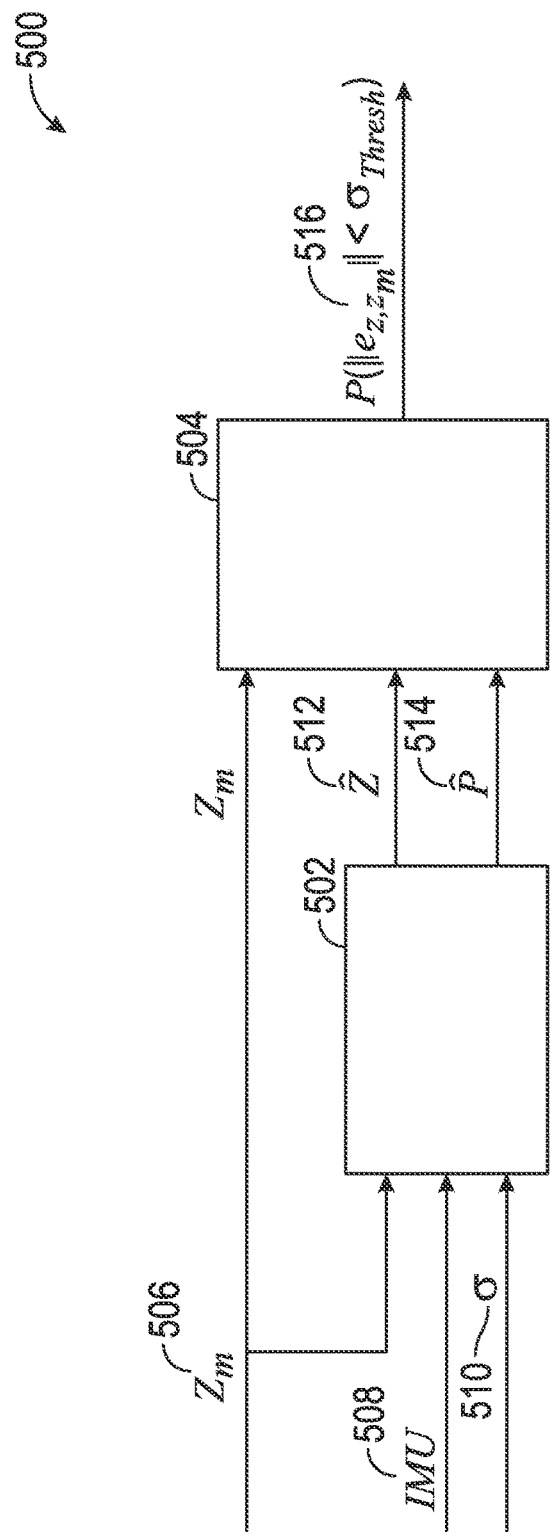
FIG. 5 is a diagram illustrating processing of input parameters to the performance assessment system, in accordance with the disclosed embodiments.

FIG. 5 is a diagram 500 illustrating processing of input parameters to assess the performance of a vehicle onboard navigation system, in accordance with the disclosed embodiments. It should be appreciated that the diagram 500 described in FIG. 4 represents one exemplary embodiment of steps 402-406 described above in the discussion of FIG. 4, including additional detail. As shown, adaptive stochastic filtering 502 is used in combination with secondary processing 504 functions to produce a probability ($P(\|e_{z,z_m}\| < \sigma_{Thresh})$) 516 that an estimated vehicle location ($\hat{Z}$) 512 exists within an error bound associated with the measured vehicle location ($z_m$) 506. Here, $\hat{Z}$ is a point estimation representing the mean value of the possible location and cannot be used alone to represent the estimated distribution. The value $\hat{\sigma}$ may also be utilized to calculate the instantaneous probability of actual vehicle position being within the accepted error bound and then by long-term averaging obtain the long-term performance index ($\bar{P}$).

The adaptive stochastic filtering 502 process receives input parameters including, but not limited to: a measured vehicle location ($z_m$) 506, inertial measurements (IMU) 508; and precision specifications ($\sigma$) 510 associated with an onboard vehicle navigation system. The measured vehicle location ($z_m$) 506 is a detected value obtained from the navigation system of the vehicle. The inertial measurements (IMU) 508 are obtained from a vehicle Inertial Measurement Unit, but may also be obtained from other motion sensors onboard the vehicle. The precision specifications ($\sigma$) 510 may be obtained directly from the vehicle navigation system or from a stored location in system memory.

The adaptive stochastic filtering 502 produces output data which includes an estimated vehicle location ($\hat{Z}$) 512 and an associated estimated covariance matrix ($\hat{P}$) 514. The estimated covariance matrix ($\hat{P}$) 514 may also be referred to as an associated "estimated distribution value". These output parameters are then used, in combination with the measured vehicle location ($z_m$) 506, in secondary processing 504 functions. The secondary processing 504 functions may include any calculation or application of a theoretical model used to generate a probability ($P(\|e_{z,z_m}\| < \sigma_{Thresh})$) 516 that the estimated vehicle location ($\hat{Z}$) 512 exists within the margin of error associated with the measured vehicle location ($z_m$) 506 provided by the navigation system.

One exemplary embodiment of appropriate secondary processing functions includes integrating a normal distribution function over an area delineated by the margin of error of the navigation system (this area was described previously with regard to FIG. 3). In this example, the probability ($P(\|e_{z,z_m}\| < \sigma_{Thresh})$) 516 is calculated using the following formula:

$$p = \int\int_s \frac{1}{2\pi\hat{\sigma}^2} e^{-\frac{x^2+y^2}{2\hat{\sigma}^2}} dxdy, \text{ where } \hat{\sigma}^2 = \frac{\hat{\sigma}_x^2 + \hat{\sigma}_y^2}{2}.$$

Here, the navigation system is evaluated by calculating the probability ($P(\|e_{z,z_m}\| < \sigma_{Thresh})$) 516 and comparing it to a predefined threshold. When not less than the predefined threshold, the calculated probability ($P(\|e_{z,z_m}\| < \sigma_{Thresh})$) 516 indicates whether the navigation system is providing accurate readings (within the allowable amount of error), and thus, whether the navigation system is operating within acceptable limits.

Here, adaptive stochastic filtering takes the measured vehicle location and nominal noise level of the measurement (specification $\sigma$), as well as the high assurance IMU signal, to produce an optimal estimation of the actual location. The estimation is represented by a mean (or expectation) value of the location ($\hat{Z}$), and a covariance matrix $\hat{P}$ (or equivalently, the standard deviation $\hat{\sigma}$).

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for monitoring performance of a navigation system onboard a vehicle, the method comprising:
    obtaining, by a vehicle electronic control unit (ECU), a triangulated vehicle location and vehicle motion data, wherein the triangulated vehicle location is obtained from the navigation system, wherein the vehicle motion data is obtained from a vehicle inertial measurement unit (IMU);
    computing an estimated vehicle location, by the vehicle ECU, using the triangulated vehicle location and the vehicle motion data, by:
        performing a Gaussian distribution function, based on the triangulated vehicle location and the vehicle motion data;
        calculating a mean value and a standard deviation value of the Gaussian distribution function, wherein the mean value comprises the estimated vehicle location and a center point of an estimated position circle, and wherein the estimated vehicle location comprises the mean value and the estimated position circle;
    calculating, by the vehicle ECU, a probability that the estimated vehicle location exists within an error bound of the triangulated vehicle location, by:
        identifying an overlap region comprising an intersection of a first area delineated by the error bound and a second area delineated by the estimated position circle, wherein the error bound comprises a maximum allowable error for the navigation system;
        integrating a normal distribution function over the first area delineated by the error bound; and
        obtaining a statistical performance index for a specified time frame by filtering the probability with an exponential moving average filter, based on integrating the normal distribution function, wherein the probability comprises the statistical performance index;
    comparing the statistical performance index to a predefined threshold, wherein the predefined threshold indicates an allowable minimum probability that the estimated vehicle position exists within the overlap region of the first area and the second area; and
    when the probability is less than the predefined threshold, indicating that the estimated vehicle location does not exist within the error bound,
        determining, by the vehicle ECU, that the navigation system is operating outside of normal operating limits; and
        deactivating an autonomous driving application, by the vehicle ECU.

2. The method of claim 1, wherein
    the vehicle ECU is configured to communicate with the vehicle IMU via a controller area network (CAN) bus; and
    wherein the vehicle motion data comprises a first vehicle speed in an x-direction, a second vehicle speed in a y-direction, and a vehicle yaw rate.

3. The method of claim 1, wherein the computing step further comprises using an adaptive stochastic filter to calculate the estimated vehicle location and the estimated distribution value.

4. The method of claim 1, wherein the computing step further comprises using a Kalman filter to calculate the estimated vehicle location and the estimated distribution value.

5. The method of claim 1, wherein the obtaining step further comprises receiving precision specifications of the navigation system; and
    wherein the method further comprises determining the error bound, based on the precision specifications.

6. A system for monitoring performance of a navigation system onboard a vehicle, the system comprising:
    the navigation system, configured to provide a triangulated vehicle location and precision specifications associated with operation of the navigation system;
    at least one vehicle motion sensor, configured to obtain vehicle motion data; and
    at least one processor of a vehicle electronic control unit (ECU), the at least one processor communicatively coupled to the navigation system and the at least one vehicle motion sensor, the at least one processor configured to:
        obtain, via the navigation system, the triangulated vehicle location;

obtain, via the at least one vehicle motion sensor, the vehicle motion data, wherein the at least one vehicle motion sensor comprises a vehicle inertial measurement unit (IMU);
compute an estimated vehicle location, using the triangulated vehicle location and the vehicle motion data, by:
performing a Gaussian distribution function, based on the triangulated vehicle location and the vehicle motion data;
calculating a mean value and a standard deviation value of the Gaussian distribution function, wherein the mean value comprises the estimated vehicle location and a center point of an estimated position circle, and wherein the estimated vehicle location comprises the mean value and the estimated position circle;
calculate a probability that the estimated vehicle location exists within an error bound of the triangulated vehicle location, by:
identifying an overlap region comprising an intersection of a first area delineated by the error bound and a second area delineated by the estimated position circle, wherein the error bound comprises a maximum allowable error for the navigation system;
integrating a normal distribution function over the first area delineated by the error bound; and
obtaining a statistical performance index for a specified time frame by filtering the probability with an exponential moving average filter, based on integrating the normal distribution function, wherein the probability comprises the statistical performance index;
compare the statistical performance index to a predefined threshold, wherein the predefined threshold indicates an allowable minimum probability that the estimated vehicle position exists within the overlap region of the first area and the second area; and
when the probability is less than the predefined threshold, indicating that the estimated vehicle location does not exist within the error bound,
determine that the navigation system is operating outside of normal operating limits; and
deactivate an autonomous driving application.

7. The system of claim 6, wherein
the vehicle ECU is configured to communicate with the vehicle IMU via a controller area network (CAN) bus; and
wherein the vehicle motion data comprises a first vehicle speed in an x-direction, a second vehicle speed in a y-direction, and a vehicle yaw rate.

8. The system of claim 6, wherein the at least one processor is configured to compute the estimated vehicle location by:
using an adaptive stochastic filter to calculate the estimated vehicle location and the estimated distribution value.

9. The system of claim 6, wherein the at least one processor is configured to compute the estimated vehicle location by:
using a Kalman filter to calculate the estimated vehicle location and the estimated distribution value.

10. The system of claim 6, wherein the at least one processor is further configured to:
receive precision specifications of the navigation system; and
determine the error bound, based on the precision specifications.

11. The method of claim 1, wherein the vehicle motion data comprises at least a vehicle speed in an x-direction, a vehicle speed in a y-direction, a vehicle yaw rate, acceleration, pitch, roll, slide, resistance, traction, and a braking force.

12. The method of claim 1, wherein a radius of the estimated position circle equals three times the standard deviation value.

13. The system of claim 6, wherein the vehicle motion data comprises at least a vehicle speed in an x-direction, a vehicle speed in a y-direction, a vehicle yaw rate, acceleration, pitch, roll, slide, resistance, traction, and a braking force.

14. The system of claim 6, wherein a radius of the estimated position circle equals three times the standard deviation value.

* * * * *